(12) United States Patent
Dieterle

(10) Patent No.: US 10,591,340 B2
(45) Date of Patent: Mar. 17, 2020

(54) METHOD FOR CALCULATING A LINEARIZATION CURVE FOR DETERMINING THE FILL LEVEL IN A CONTAINER THE USE OF A MOBILE END DEVICE FOR SAID METHOD

(71) Applicant: VEGA GRIESHABER KG, Wolfach (DE)

(72) Inventor: Marcel Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 167 days.

(21) Appl. No.: 15/585,322

(22) Filed: May 3, 2017

(65) Prior Publication Data

US 2017/0370757 A1  Dec. 28, 2017

(30) Foreign Application Priority Data

Jun. 23, 2016 (DE) .......................... 10 2016 111 570

(51) Int. Cl.
| | |
|---|---|
| *G01F 23/00* | (2006.01) |
| *G01B 11/24* | (2006.01) |
| *G01B 11/22* | (2006.01) |
| *G01F 23/26* | (2006.01) |
| *G01F 23/284* | (2006.01) |
| *G01F 23/296* | (2006.01) |

(52) U.S. Cl.
CPC .......... *G01F 23/0061* (2013.01); *G01B 11/22* (2013.01); *G01B 11/24* (2013.01); *G01F 23/26* (2013.01); *G01F 23/284* (2013.01); *G01F 23/296* (2013.01)

(58) Field of Classification Search
CPC .... G01F 23/0061; G01F 23/26; G01F 23/284; G01F 23/296; G01B 11/22; G01B 11/24
See application file for complete search history.

(56) References Cited

U.S. PATENT DOCUMENTS

| | | | |
|---|---|---|---|
| 2006/0117848 A1* | 6/2006 | Raffalt | G01F 23/00 73/313 |
| 2007/0028684 A1* | 2/2007 | Benz | G01F 23/284 73/314 |
| 2007/0080223 A1* | 4/2007 | Japuntich | G01K 1/024 235/439 |

(Continued)

FOREIGN PATENT DOCUMENTS

| | | |
|---|---|---|
| DE | 10 2009 050 460 A1 | 6/2010 |
| DE | 10 2014 017 490 A1 | 6/2016 |
| WO | WO 2015/139785 A1 | 9/2014 |

OTHER PUBLICATIONS

GPO search report for related application 10 2016 111 570.3, dated Feb. 8, 2017.

*Primary Examiner* — Mohammad K Islam
(74) *Attorney, Agent, or Firm* — William Gray Mitchell

(57) ABSTRACT

Method for calculating a linearization curve for determining the fill level in a container from a filling height, said method comprising the following steps: acquiring three-dimensional data of the container with a mobile end device, having at least one optical camera, a depth sensor and a motion detector, establishing a three-dimensional model of the container, and calculating the linearization curve from the three-dimensional model for determining a fill level from a measured filling height.

8 Claims, 3 Drawing Sheets

(56) References Cited

U.S. PATENT DOCUMENTS

| | | | | |
|---|---|---|---|---|
| 2009/0272677 | A1* | 11/2009 | Mallett | B07C 7/005 209/583 |
| 2010/0220187 | A1* | 9/2010 | Lichtblau | G01F 23/292 348/135 |
| 2012/0307072 | A1* | 12/2012 | Folk | G06Q 10/087 348/159 |
| 2012/0314059 | A1* | 12/2012 | Hoffmann | G01F 23/292 348/135 |
| 2013/0213518 | A1* | 8/2013 | Bonefas | A01D 43/073 141/1 |
| 2013/0335557 | A1* | 12/2013 | Faber | G01V 8/10 348/135 |
| 2014/0052407 | A1* | 2/2014 | Ladd | G01B 13/16 702/167 |
| 2014/0125994 | A1* | 5/2014 | Kim | G01B 11/22 356/601 |
| 2015/0324003 | A1* | 11/2015 | Kang | G06F 3/017 356/72 |
| 2017/0284854 | A1* | 10/2017 | Skowaisa | G01S 7/4026 |
| 2018/0164143 | A1* | 6/2018 | Gurumohan | G01F 23/2962 |

* cited by examiner

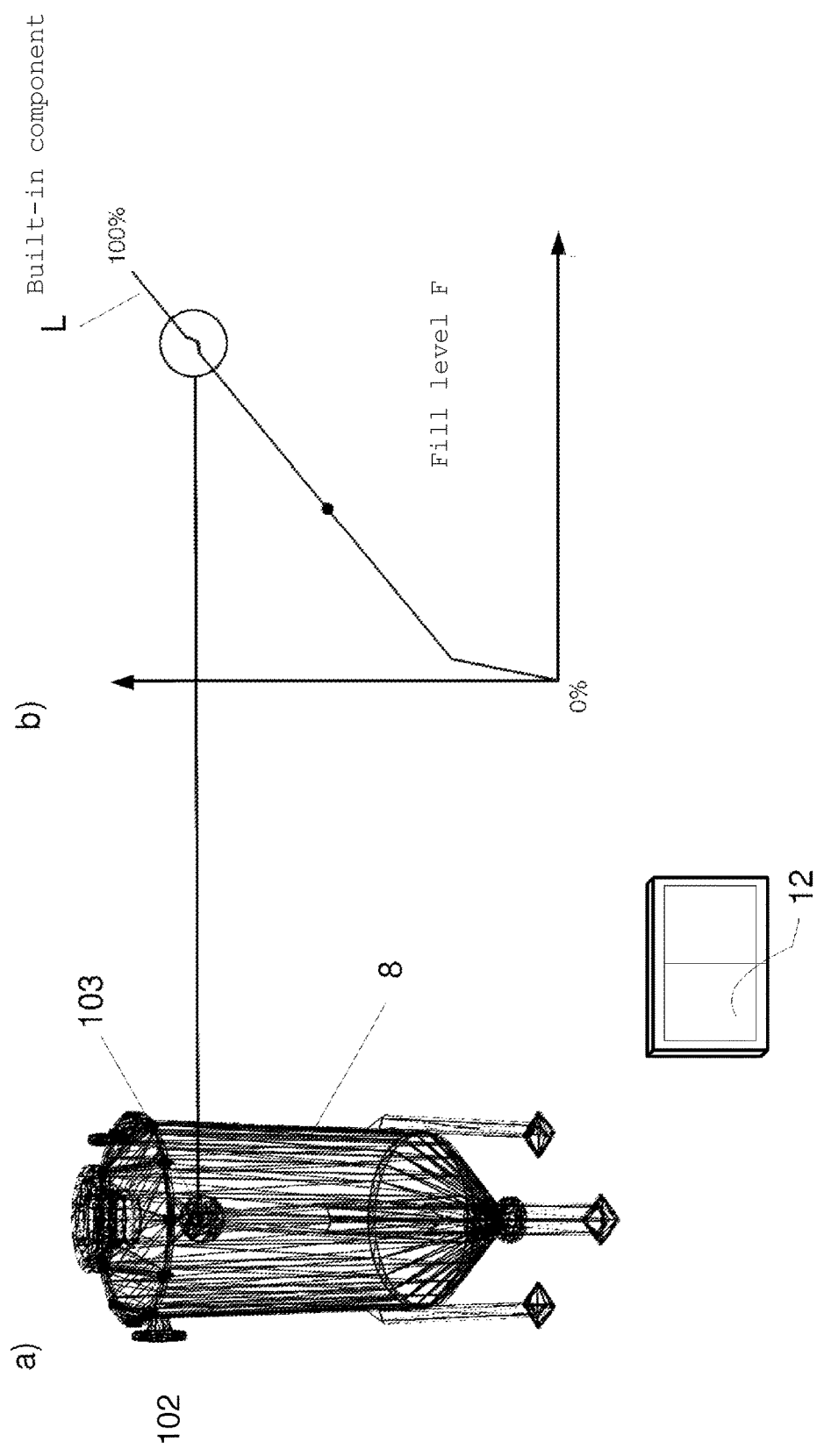

METHOD FOR CALCULATING A LINEARIZATION CURVE FOR DETERMINING THE FILL LEVEL IN A CONTAINER THE USE OF A MOBILE END DEVICE FOR SAID METHOD

CROSS REFERENCE TO RELATED APPLICATIONS

This patent application claims priority to German Patent Application 10 2016 111 570.3, filed on Jun. 23, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a method for calculating a linearization curve for determining the fill level in a container the use of a mobile end device for said method.

Background of the Invention

The present invention relates to a method for calculating a linearization curve for determining the fill level in a container from a filling height in accordance with the preamble of patent claim 1 and to the use of a mobile end device for this method in accordance with patent claim 8.

The present invention relates to the field of process measuring technology and in this case, particularly to the technology of measuring the fill level. To determine the fill level in a container, the standard procedure in level measuring technology is to calculate the fill level, based on a filling height. In this case, the filling height can be determined in a number of ways. Known methods for determining the filling height in a container are, on the one hand, starting from the bottom of the container, the hydrostatic determination of a fill medium-induced pressure level, and, on the other hand, starting from the cover lid of the container, the determination of the distance between a sensor position and a surface of the filling material by means of radar, guided radar, ultrasound, in a capacitive manner or by means of other suitable methods; or the determination of discrete limit levels inside the container, starting from, for example, a side wall of the container.

All of the aforementioned methods have in common that the cited measurement methods do not determine the fill level of the container, but rather determine only a filling height inside the container. The correlation between a filling height and the fill level is described by a so-called linearization curve that describes, as a function of a container geometry and any built-in components in the container, a function for converting the filling height into the fill level. Commensurate linearization curves can be calculated in the period only extremely inaccurately by means of manual measurements and with the aid of linearization tables. In the case of the methods known from the prior art for this purpose, it is not possible to consider or it is possible only to a limited extent to consider, for example, irregularities inside the container and/or the effects of built-in components in containers when determining the fill level.

This is where the present invention come in.

The object of the present invention is to provide a method for calculating a linearization curve for determining the fill level in a container from a filling height, by means of which a higher degree of measuring accuracy can be achieved.

This object is achieved by means of a method exhibiting the features disclosed herein and by means of the use of a mobile end device that is intended for this method and that exhibits the features also disclosed herein.

BRIEF SUMMARY OF THE INVENTION

In a preferred embodiment, a method for calculating a linearization curve (L) for determining the fill level (F) in a container (10) from a filling height (h), characterized by the following steps:
  acquiring two dimensional data and a reference value of a container (10) having a symmetry with a mobile end device, having at least one optical camera (14)
  entering the type of symmetry
  establishing a three dimensional model (8) of the container (10),
  calculating the linearization curve (L) from the three dimensional model (8) for determining a fill level (F) from a measured filling height.

In another preferred embodiment, a method for calculating a linearization curve (L) for determining the fill level (F) in a container (10) from a filling height (h), characterized by the following steps:
  acquiring three dimensional data of the container (10) with a mobile end device (12), having at least one optical camera (14), a depth sensor (16) and a motion detector (18),
  establishing a three dimensional model (8) of the container (10),
  calculating the linearization curve (L) from the three dimensional model (8) for determining a fill level (F) from a measured filling height.

In another preferred embodiment, the method as described herein, characterized in that the three dimensional data of at least one outer shell (101) of the container (10) are acquired.

In another preferred embodiment, the method as described herein, characterized in that, in addition, a material thickness (d) of the container is entered.

In another preferred embodiment, the method as described herein, characterized in that the three dimensional data of an inner shell (102) of the container (10) are acquired.

In another preferred embodiment, the method as described herein, characterized in that the acquisition of the three dimensional data of the container (10) occurs in accordance with one or a combination of the methods: time of flight, structured light or stereoscopy.

In another preferred embodiment, the method as described herein, characterized in that the three dimensional acquisition of the container (10) is supported by means of a database with three dimensional data of possible built-in components.

In another preferred embodiment, the method as described herein, characterized in that, in addition to the linearization curve (L), a suitable fill level measuring method and/or an optimized position for a fill level sensor is/are determined and outputted.

In another preferred embodiment, the use of a mobile end device (12) having at least one optical camera (14), for acquiring preferably three dimensional data of a container (10), for establishing a three dimensional model (8) of the container (10) as well as for calculating a linearization curve (L) for determining a fill level (F) from a filling height.

In another preferred embodiment, the use of a mobile end device (12) having at least one optical camera (14), a depth sensor (16) and a motion detector (18) for acquiring three dimensional data of a container (10), for establishing a three dimensional model (8) of the container (10) as well as for calculating a linearization curve (L) for determining a fill level (F) from a filling height.

BRIEF DESCRIPTION OF THE DRAWINGS

FIG. 3A) is a line drawing evidencing a three-dimensional model of the container from FIG. 1.

FIG. 3B) is a line drawing evidencing a linearization curve calculated from this three-dimensional model.

DETAILED DESCRIPTION OF THE INVENTION

Figure 1:
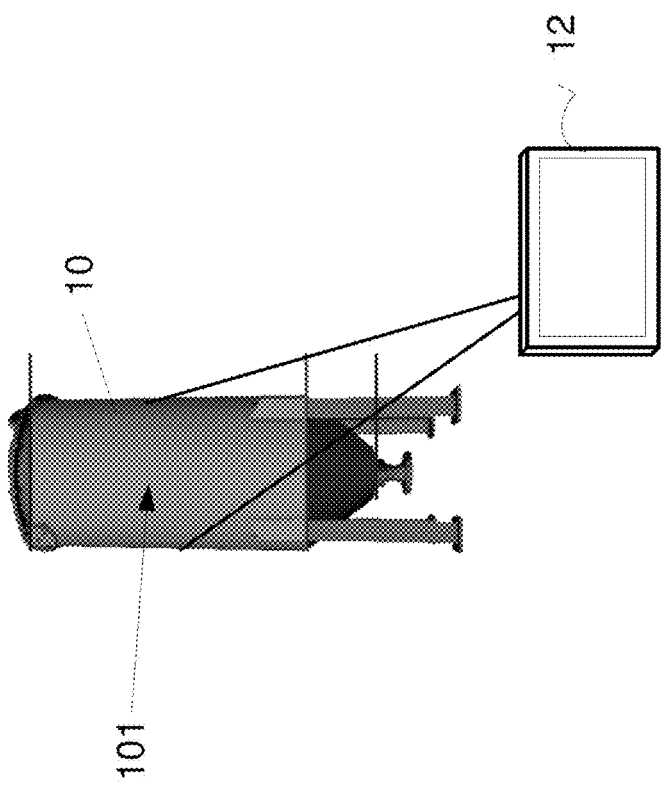
FIG. 1 is a line drawing evidencing an exemplary container and a mobile end device.

The invention comprises an inventive method for calculating a linearization curve for determining the fill level in a container from a filling height is characterized by the following steps:
  acquiring two-dimensional data and a reference value of a container (10) having a symmetry with a mobile end device, having at least one optical camera (14)
  entering the type of symmetry
  establishing a three-dimensional model (8) of the container (10),
  calculating the linearization curve (L) from the three-dimensional model (8) for determining a fill level (F) from a measured filling height.

According to the present invention, two-dimensional data of the container and a reference value are acquired with the aid of a mobile end device, for example, a tablet computer, a mobile telephone or any other suitable mobile end device, which has at least one optical camera for capturing and visualizing an image of the container. The two-dimensional data of the container, the reference value and information about the symmetry of the container can be used to create, preferably with the mobile end device, a two-dimensional model of the container with a high degree of accuracy. Preferably the three-dimensional model of the container is vector-based.

As soon as the three-dimensional model of the container is completely finished and available for the relevant parts of the container, said three-dimensional model of the container can be used to calculate, preferably with the mobile end device, the linearization curve for determining the fill level in the container, based on a measured filling height. Since the three-dimensional model of the container that is established in this way and the linearization curve that is calculated from said three-dimensional model take into account the actual local conditions, it is possible to consider, in particular, the irregularities of the container, the built-in components and/or other special features when determining the fill level. In this way it is possible to achieve an accuracy of measurement that is much better than that achieved in the methods of the prior art.

A further development of the method comprises the following steps:
  acquiring three-dimensional data of the container with a mobile end device, having at least one optical camera, a depth sensor and a motion detector,
  establishing a three-dimensional model of the container, and
  calculating the linearization curve from the three-dimensional model for determining a fill level from a measured filling height.

According to the further developed method, three-dimensional data of the container are acquired with the aid of the mobile end device, which comprises at least one optical camera for capturing and visualizing an image of the container, a depth sensor for detecting the distance of individual points of the container surface from the mobile end device as well as a motion detector for detecting at least one relative movement of the mobile end device. The use of a depth sensor and a motion detector makes it possible to automate the acquisition of the reference value and the symmetry of the container; and it makes it easy to take into account, in particular, complex symmetries. It is even possible to detect containers without a simple symmetry. From the three-dimensional data of the container, which can be determined, in particular, from the data acquired with the aid of the depth sensor and the motion detector, it is possible to create, preferably with the mobile end device, a three-dimensional model of the container with a high degree of accuracy. Preferably the three-dimensional model of the container is vector-based.

As soon as the three-dimensional model of the container is completely finished and available for the relevant parts of the container, said three-dimensional model of the container can be used to calculate, preferably with the mobile end device, the linearization curve for determining the fill level in the container, based on a measured filling height. Since the three-dimensional model of the container that is established in this way and the linearization curve that is calculated from said three-dimensional model take into account the actual local conditions, it is possible to consider, in particular, the irregularities of the container, the built-in components and/or other special features when determining the fill level. In this way it is possible to achieve an accuracy of measurement that is much better than that achieved in the methods of the prior art.

In a simple variant of the method according to the invention, the three-dimensional data of at least one outer shell of the container are acquired. Owing to the acquisition of the three-dimensional data of the outer shell of the container it is already possible to obtain, preferably with information about, for example, the wall thickness of the container, very good linearization curves for determining the fill level inside the container from the filling height.

In a preferred variant of the method according to the invention, the three-dimensional data of an inner shell of the container are acquired in addition to or as an alternative to the three-dimensional data of the outer shell of the container. With the aid of the three-dimensional data of the inner shell of the container, i.e., in particular, the inner dimensions and the built-in components, an exact linearization curve for determining the fill level inside the container can be calculated from the filling height. In this way it is possible to take into account, in particular, the influences of the built-in components on the fill level, so that very exact measurement values can be obtained.

The acquisition of the three-dimensional data of the container can be carried out, in particular, in accordance with one method or a combination of the methods: time of flight, structured light or stereoscopy. The aforementioned methods constitute different methods for acquiring depth information by means of the measurement of the time from the emission of a light pulse until the reception of the light pulse reflected from the object to be measured (time of flight), the projection of a structured light carpet, for example, a grid or points on the object to be measured and the detection of the projection (structured light) or the utilization of stereoscopic effects for data acquisition of the depth and size of the object to be measured, in this case, the container.

The three-dimensional acquisition of the container can be facilitated, for example, by means of a database with three-dimensional data of possible built-in components. For example, three-dimensional data of a plurality of built-in components that are typically used in, for example, tanks or silos, can be stored in such a database and can be retrieved in order to help establish the three-dimensional model. In this way, in particular, built-in components with complex geometric shapes can be easily detected and taken into account.

Furthermore, in addition to the linearization curve, a suitable fill level measuring method and/or an optimized position for a fill level sensor can be determined and outputted. By knowing the concrete geometry of a container and the local built-in components, an optimized choice of a fill level measuring method can take place here by, for example, an analysis of the emission cones, needed by certain measurement methods, with respect to a free space, in which this measurement can occur.

Inventive is also the use of a mobile end device having at least one optical camera, a depth sensor and a motion detector for acquiring three-dimensional data of a container, for establishing a three-dimensional model of the container as well as for calculating a linearization curve for determining a fill level from a filling height.

DETAILED DESCRIPTION OF THE FIGURES

FIG. 1 shows, as an example, a container 10, for which a linearization curve L for determining the fill level F from the filling height h is to be calculated. In the present exemplary embodiment the container 10 is designed as a silo with a circularly cylindrical main body and a truncated conical bottom portion that is disposed on the underside of this main body and is designed for attaching an outlet. Furthermore, the silo 10 has four supporting feet and a corresponding cover lid.

Furthermore, FIG. 1 shows a mobile end device 12, which is configured for acquiring three-dimensional data of objects. In the present exemplary embodiment the mobile end device 12 is designed as a tablet computer, but it could also have the form of a mobile telephone, a video camera or a photo camera or the like.

Figure 2:
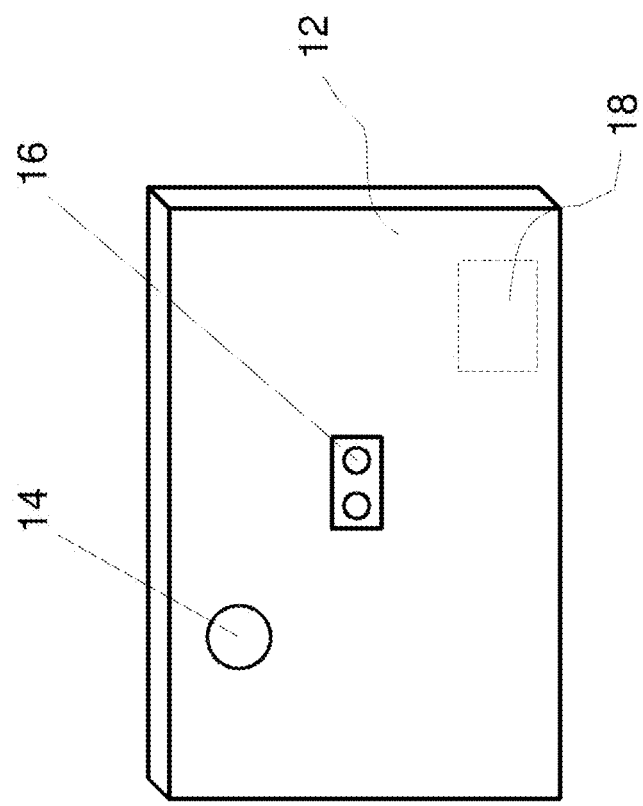
FIG. 2 is a line drawing evidencing the mobile end device from FIG. 1.

The mobile end device 12 from FIG. 1 is shown on an enlarged scale in FIG. 2. It can be seen in FIG. 2 that the mobile end device 12 has an optical camera 14, a depth sensor 16 and a motion detector 18. The optical camera 14 is used in essence to capture an image of an object to be measured and for outputting this image on a screen of the mobile end device, so that in this way a user can see a region of the captured image directly on the mobile end device.

The depth sensor 16 can acquire information about the depth and size of the object to be detected by using various methods. In the present exemplary embodiment the depth sensor 16 is designed with an infrared projector for projecting a structured infrared light carpet on the object to be detected and with a corresponding infrared sensor for detecting the light carpet on the object. An analysis of the reflected light carpet and its distortions produced on the object to be measured can be used to draw conclusions about the geometry of the object to be measured and about its size.

Both the depth data and the size data that pertain to the object to be measured and that are acquired from various positions can be brought together by means of the motion detector 18, which detects the relative movements of the mobile end device 12; and, as a result, a complete three-dimensional model of the object to be measured can be calculated.

At this point it should be mentioned that the depth sensor 16 can also operate by means of other suitable methods, for example, by using stereoscopic effects and/or by means of a plurality of distance measurements by determining the time between the emission of a light pulse and the arrival of its reflection or a combination of these methods also with the structured light method described above.

FIG. 3a) shows, as an example, the three-dimensional model 8 of the container 10 from FIG. 1. In the present exemplary embodiment both the outer shell 101 and the inner shell 102 of the container 10 were detected. Furthermore, in the course of detecting the inner shell 102, the built-in components 103, which may be found in the container 10, were also detected, so that in this case a very detailed three-dimensional model 8 was created.

At this point it should be noted that it is also possible to acquire, depending on the requirements of the individual case, just the three-dimensional data of the outer shell 101 or the inner shell 102 and/or the built-in components 103.

The linearization curve L (shown in FIG. 3B)) for determining a fill level F from the filling height h was calculated from the three-dimensional model 8 of the container 10 (shown in FIG. 3A)), taking into account the acquired three-dimensional data. It can be seen in FIG. 3B) that, in particular, the built-in component 103, which can be seen in FIG. 3A), was considered in this linearization curve L.

LIST OF REFERENCE NUMBERS

8 Three-dimensional model
10 container
12 mobile end device
14 camera
16 depth sensor
18 motion detector
L linearization curve
h filling height
F fill level
d material thickness
101 outer shell
102 inner shell
103 built-in components
8 three-dimensional model The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A method for determining a fill level in a container from a measured filling height using a mobile end device, the method comprising the following steps:
    acquiring, by at least one optical camera, two-dimensional data of the container and a reference value of the container having an image symmetry of the container with the mobile end device,
    establishing a three-dimensional vector model of the container using the two-dimensional data, the reference value and information about the symmetry of the container, and
    calculating a linearization curve from the three-dimensional vector model for determining the fill level from the measured filling height.

2. The method of claim 1, wherein the three-dimensional data of at least one outer shell of the container are acquired.

3. The method of claim 2, further comprising wherein a material thickness of the container is entered.

4. The method of claim 1, wherein the three-dimensional data of an inner shell of the container are acquired.

5. The method of claim 1, wherein the acquisition of the three-dimensional data of the container occurs in accordance with one or a combination of the methods: time of flight, structured light or stereoscopy.

6. The method of claim 1, wherein the three-dimensional acquisition of the container is supported by means of a database with three-dimensional data of possible built-in components.

7. The method of claim 1 further comprising, wherein, in addition to the linearization curve, a suitable fill level measuring method and/or an optimized position for a fill level sensor is/are determined and outputted.

8. A system for determining a fill level in a container from a filling height, the system comprising:
    a mobile device having at least one optical camera;
    the mobile end device configure to
        acquire two-dimensional data of the container and a reference value of the container having an image symmetry of the container with the mobile end device using at least one optical camera,
        establish a three-dimensional vector model of the container using the two-dimensional data, the reference value and information about the symmetry of the container, and
        calculating a linearization curve from the three-dimensional vector model for determining the fill level from a measured filling height.

* * * * *